No. 783,107. PATENTED FEB. 21, 1905.
H. T. DAVIS & E. PERRETT.
APPARATUS FOR SEPARATING OILY OR SIMILAR IMPURITIES FROM WATER.
APPLICATION FILED MAR. 29, 1904.

3 SHEETS—SHEET 1.

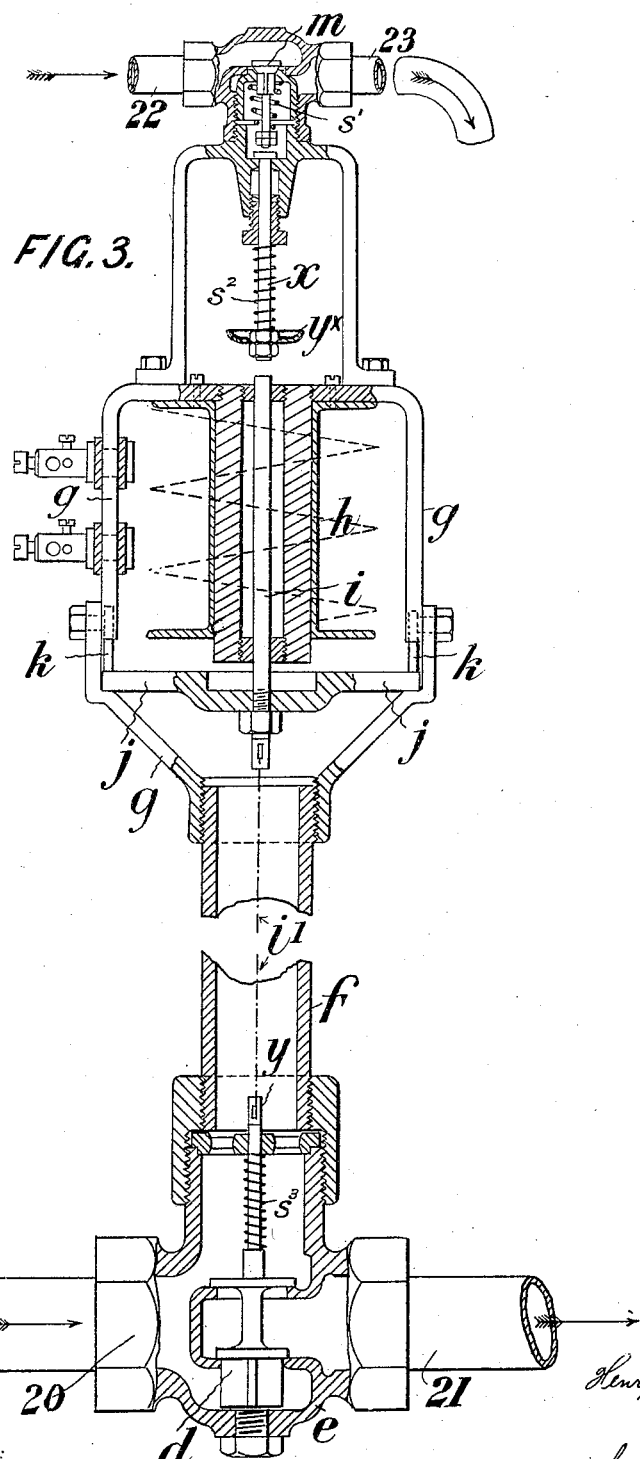

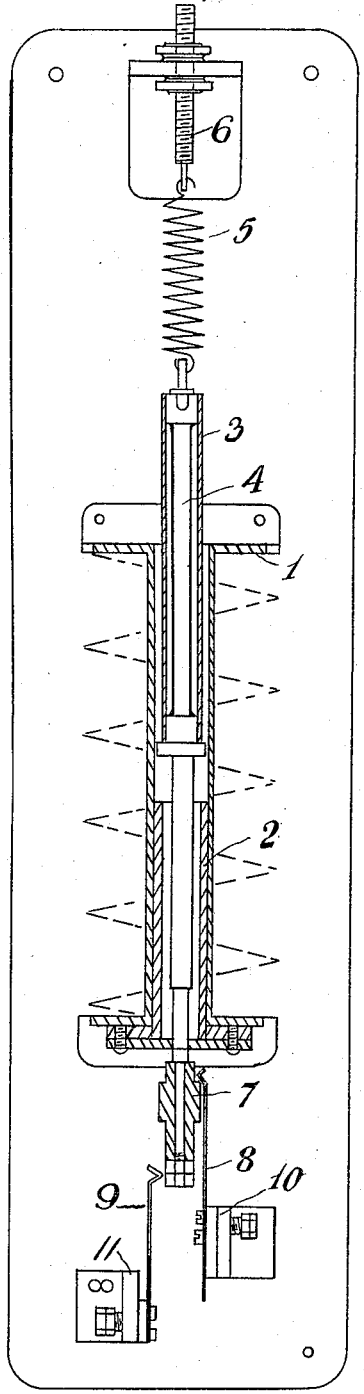
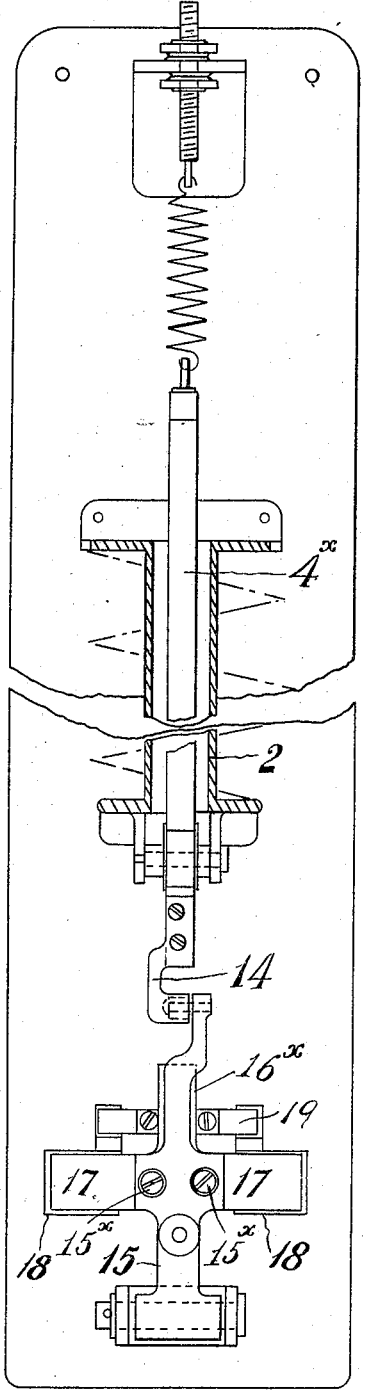
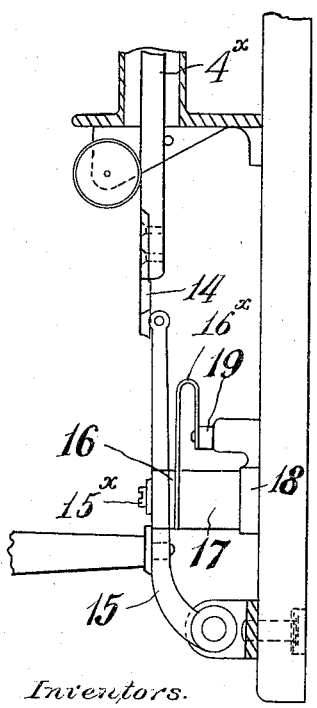

No. 783,107.

Patented February 21, 1905.

UNITED STATES PATENT OFFICE.

HENRY TADWELL DAVIS AND ERNEST PERRETT, OF LONDON, ENGLAND.

APPARATUS FOR SEPARATING OILY OR SIMILAR IMPURITIES FROM WATER.

SPECIFICATION forming part of Letters Patent No. 783,107, dated February 21, 1905.

Application filed March 29, 1904. Serial No. 200,557.

*To all whom it may concern:*

Be it known that we, HENRY TADWELL DAVIS and ERNEST PERRETT, subjects of the King of Great Britain, residing at London, England, have invented new and useful Improvements in Apparatus for Separating Oily or Similar Impurities from Water, of which the following is a specification.

This invention relates to the mode and means described in the specification of our patent dated November 17, 1903, No. 744,171, for separating the oily or greasy impurities from water contaminated therewith, and especially the oily particles which are contained in condense-water from steam-engines and which form an emulsion therewith. Such oily water is, according to the patent, admitted to a tank or tanks fitted with a number of sheet-iron or other suitable electrodes, by preference so arranged that the water takes a circuitous path while subjected to electric current supplied to the said electrodes, and there is added to the oily water at its inlet end a small regulated quantity of ordinary clean water or of carbonate of soda or of potash dissolved in water, by which means or other such means—as, for instance, a suitable gaseous fluid—the conductivity of the oily water or emulsion is increased or rendered effective, the clean water or other conductive fluid diffused therein forming, as it were, conductive paths for the current. In this way the oily-emulsion particles become detached and are then, together with the other oily particles which were merely suspended in the water, easily removed by filtration or by filter-press or by settling.

Now our present invention relates to the employment of means for preventing the accidental admission of oily or untreated water to the boiler and for saving labor and attention. For this purpose we provide improved means for the automatic electrical regulation of the inlet of the oily water, together with a signaling device and means for the automatic electrical regulation of the admission of the clean water or conducting fluid and for the automatic cutting off of current to the apparatus in case the current rises or falls to an undue extent, all as hereinafter described.

Figure 1:
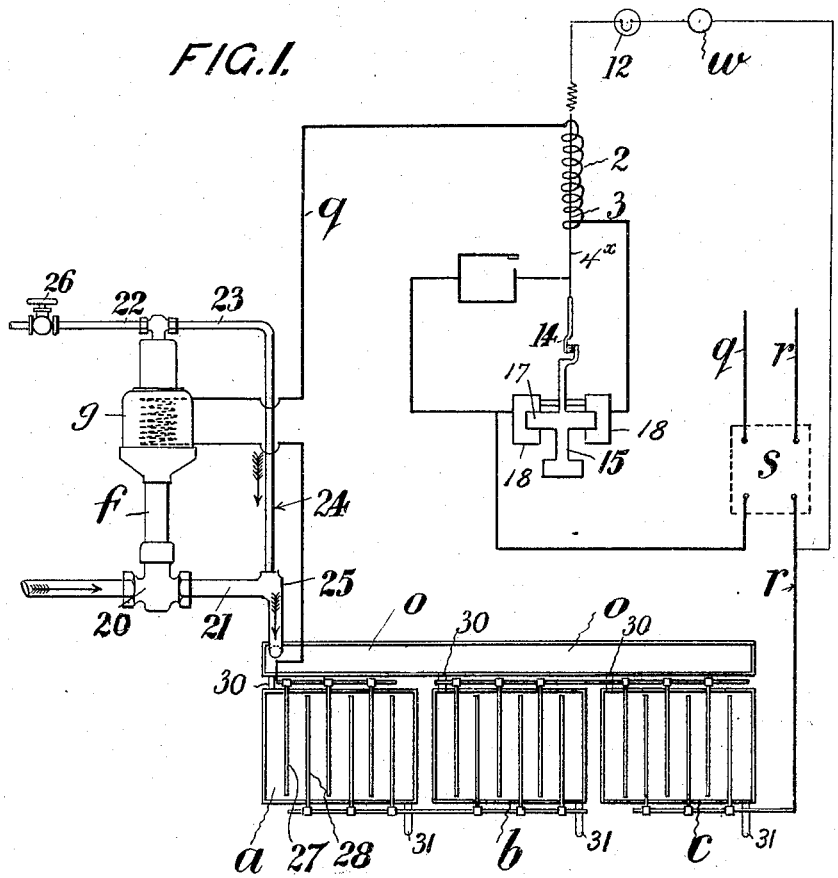
Figure 2:
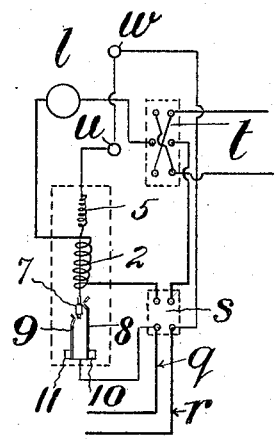

Figure 1 is a diagrammatic view illustrating the general arrangement of parts of an apparatus embodying our invention. Fig. 2 is a modification of a diagram illustrating the arrangement for reversing the current as required from time to time for the purpose of causing the electrodes to wear equally. Fig. 3 is a partial vertical section through the device for supplying the clean and oily water. Fig. 4 is a vertical section through a maximum and minimum indicator. Fig. 5 is a front view, partly in section, of a maximum and minimum switch device; and Fig. 6 is a side view of the lower portion of Fig. 5.

In Fig. 1 three tanks $a$, $b$, and $c$ are shown as an example arranged electrically in series by the conductors $q$ and $r$ and arranged in parallel as regards the water, which first enters a compartment $o$ and thence divides off to the three tanks or compartments; but any suitable number of such tanks may be used.

The means for admitting and commingling the oily water and the clean water are shown to the left in Fig. 1 and more clearly in the enlarged detail view, Fig. 3. The oily water enters at 20 and passes off at 21. The clean water enters at 22, as regulated by a valve 26, Fig. 1, and when the valve $m$, Fig. 3, is raised it passes off at 23 and through a small pipe 24, Fig. 1, to a T piece or head 25, where the two liquids commingle and then pour into the compartment $o$. We prefer this arrangement to that of passing the clean water direct to the tanks $a$ $b$ $c$.

The valve $d$ for the oily-water inlet is shown double-seated and arranged in a valve-box $e$, which by a pipe $f$, Figs. 1 and 3, is united to an upper frame $g$, that carries an electromagnet $h$, wherein works a stem $i$ of an armature $j$, the latter being guided by pins $k$, fixed in the frame $g$.

The clean-water-supply valve $m$ is held to its seat by a helical spring $s'$. A stem $x$ serves for raising the valve and is provided with a drip-catcher $y^x$ and a counteracting helical spring $s^2$. The stem $i$ of the armature is connected to a stem $y$ of the valve $d$ by a chain $i''$, said valve $d$ being held on its seat by a spring $s^3$.

The tanks are provided with iron or other suitable electrodes, (indicated at 27 28,) as described in our aforesaid patent, and electrically connected with the poles of a dynamo by wires $q$ and $r$, a double-pole cut-out being provided at $s$, a maximum and minimum indicator 9, Figs. 2 and 4, and a maximum and minimum switch device at 14, Figs. 1, 5, and 6. It will be seen that the valves $m$ and $d$, partly by their weight and partly by the springs, close on their seats when the current ceases or is interrupted.

The maximum and minimum indicator, Fig. 4, consists of a solenoid 1, provided with a fixed core 2 and a movable core 3, the latter carried on a brass spindle 4, supported by a spring 5, which can be adjusted by a screw 6. On the lower end of the spindle 4 is provided a brass sleeve 7, which on rising and falling makes contact with silver springs 8 and 9. Terminals 10 and 11 are connected to a signal-lamp 12, Fig. 1, so that as the core 3 rises or falls the lamp is lighted. Two differently-colored lamps may be used. The springs 8 and 9 are adjustable in the terminals, so as to be set according to any predetermined current.

Mercury-cups or other known contact devices may be used instead of the device shown.

The maximum and minimum switch device shown in detail in Figs. 5 and 6 serves for automatically cutting off the current if it falls below or rises above a predetermined limit. A brass rod or spindle $4^\times$ in this case terminates in an escapement 14, the lower part or switch-arm 15 of which is pivoted below and carries a laminated spring 17, which latter makes contact across blocks 18 18. On the core rising or falling the escapement 14 allows the switch-arm 15 to fly out and break the circuits.

The switch may be provided with an auxiliary contact 19, carried by a spring $16^\times$, which is arranged to break the circuit after the main switch has left the contacts in order to prevent the same from being damaged by sparking. The spring $16^\times$ is in metallic contact with the spring 17, but is insulated from the arm 15 by a piece 16. The two screws $15^\times$ unite the parts 15, 16, $16^\times$, and 17.

When the current is admitted to the apparatus, the electromagnet $h$ is energized and the armature $j$, Fig. 3, is drawn up, carrying the stem $i$, which pushes up the stem $x$, thus opening the valve $m$, whereby clean water is admitted by the pipe 23 to the head 25. At the same time the stem $i$, through the medium of the chain $i'$, pulls up and opens the valve $d$, whereby oily water is admitted to the head 25, wherefrom the clear and oily water commingled pour into the compartment $o$ and thence through pipes 30 into the said tanks.

When the current rises above or falls below the predetermined limits, the escapement device, Figs. 5 and 6, opens the circuit of the electromagnet $h$ and the valves $m$ and $d$ drop into their seats and close, so that neither oily water nor clean water can enter the tanks $a$ $b$ $c$. The valves will open again when the current resumes its normal or proper character.

Supposing the current falls below the set or predetermined amount, the core of the solenoid at 3, Figs. 1 and 4, rises and releases the switch-arm 15, which immediately, impelled by the spring 17, flies off and breaks the circuit. The solenoid-core similar to that shown at 3, Fig. 4, now rises to its full extent by a spring similar to that shown in Fig. 4 and lights the lamp 12. In case the current exceeds its predetermined limit the core 3 is pulled down to its full extent. The roller on upper end of switch-arm 15 enters the gap shown at 14, flies off, impelled by the spring 17, and breaks the circuit. The valves $d$ and $m$ close in both cases.

Fig. 2 represents a switch for reversing the current occasionally as required to prevent the electrodes from wearing unequally. $l$ designates an armature, and $w$ a lamp cut-out. The wires $q$ and $r$ lead to the poles of the dynamo.

In the case of a steam plant where the generation of the current is produced by a dynamo driven by the engines, the condense-water from which is being treated by this invention, it is not so absolutely necessary to provide the maximum and minimum switch device shown in Figs. 5 and 6 nor the valves shown in Fig. 3, because when the engine stops the supply of condense-water is also stopped; but even in such cases the signaling devices, Figs. 1 and 2, would be applied.

Having thus described our invention, what we claim as new therein, and desire to secure by Letters Patent, is—

1. In an installation of the character referred to, the combination of a valve for supplying the oily water, a valve for supplying the conducting fluid, electric means for opening said valves when the current is turned on and automatic means for closing them when the current ceases or is interrupted, substantially as set forth.

2. In an installation of the character referred to, the combination of a valve for supplying the oily water, a valve for supplying the conducting fluid, a solenoid or electromagnet for simultaneously opening both valves, when the current is turned on, and automatic means for closing them when the current ceases or is interrupted, substantially as set forth.

3. In an installation of the character referred to, the combination of a double-seated spring-loaded valve for supplying the oily water, an electromagnet, its armature provided with a stem passing up through the electromagnet, a chain connecting the valve and the armature, a spring-loaded valve for supplying the conducting fluid, a spring-loaded guided stem between the stem on the armature and the last-named valve, and a framing wherein the said parts are mounted in the same vertical line, substantially as set forth.

4. In an installation of the character referred to, the combination of a valve for supplying the oily water, a valve for supplying the conducting fluid, electric means for opening said valves when the current is turned on, automatic means for closing them when the current ceases or is interrupted and a maximum and minimum indicator consisting of a solenoid with a spring-suspended movable core with two contacts at different levels on the lower end of same, two spring-contacts operating with one or other of said core-contacts, a shunt-circuit and a lamp therein, substantially as set forth.

5. In an installation of the character referred to, the combination of a valve for supplying the oily water, a valve for supplying the conducting fluid, electric means for opening said valves when the current is turned on, automatic means for closing them when the current ceases or is interrupted, a maximum and minimum indicator consisting of a solenoid with a spring-suspended movable core with two contacts at different levels on the lower end of same, two spring-contacts operating with one or other of said core-contacts, and a shunt-circuit with lamp therein, and in combination with a maximum and minimum switch device for automatically cutting off the current when it falls below or rises above a predetermined limit, said device consisting of a solenoid, a core terminating in an escapement-like contact and a hinged spring-switch, substantially as set forth.

In testimony whereof we have signed our names to this specification in the presence of two subscribing witnesses.

HENRY TADWELL DAVIS.
ERNEST PERRETT.

Witnesses:
REGINALD SMITH,
VICTOR JENSEN.